Jan. 11, 1966      C. O. PEDERSEN      3,228,306

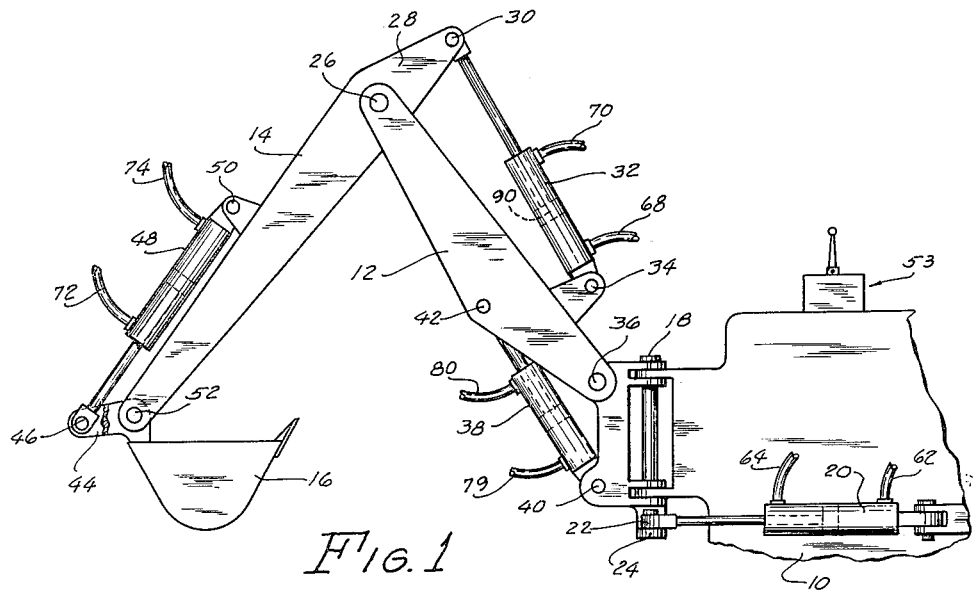

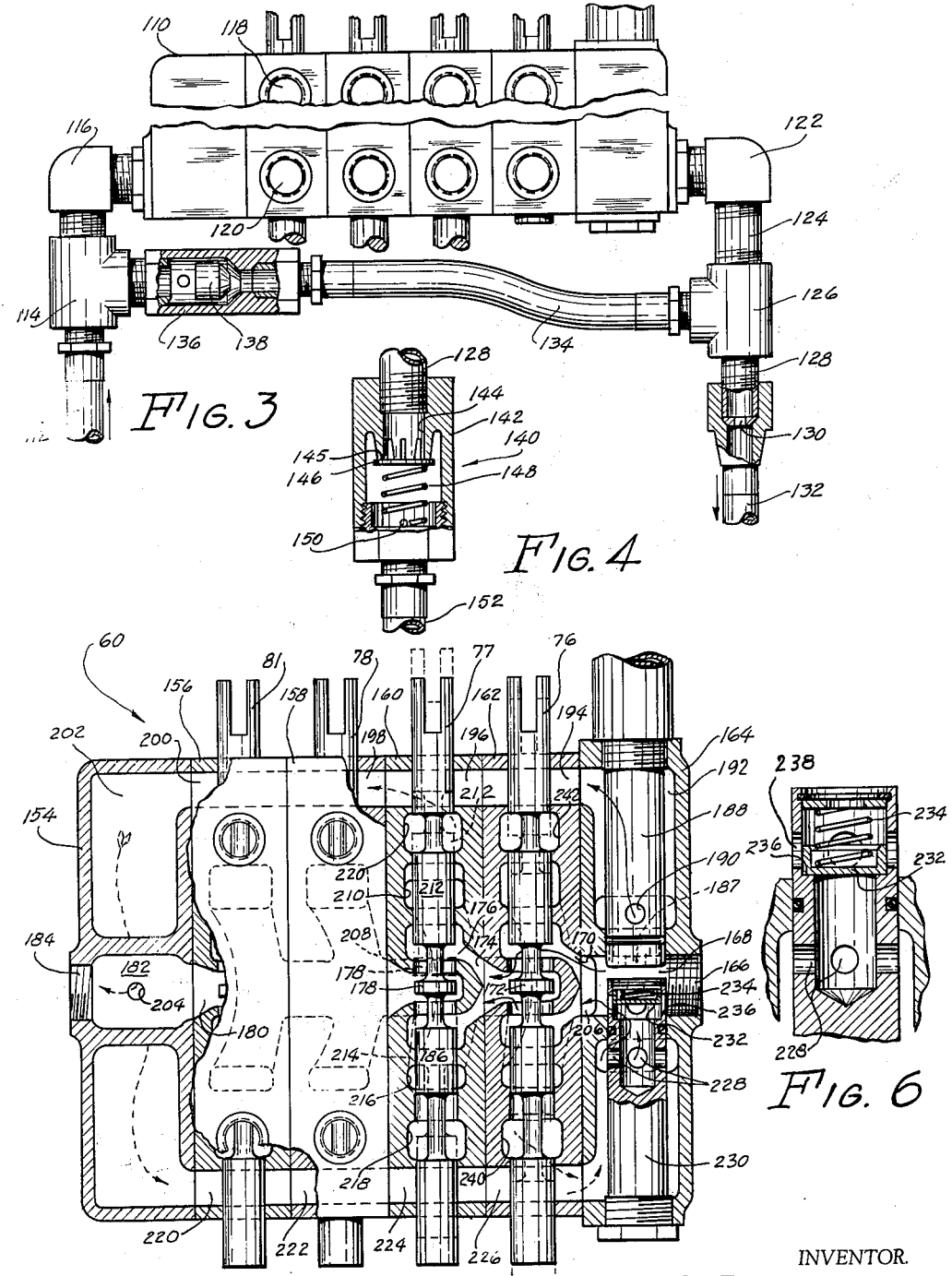

CONTROL VALVE

Filed Feb. 10 1964      3 Sheets-Sheet 3

INVENTOR.
CARL O. PEDERSEN
BY: Emerson B Donnell ATT.
Robert E. Godard AGT.

United States Patent Office 3,228,306
Patented Jan. 11, 1966

3,228,306
CONTROL VALVE
Carl O. Pedersen, Burlington, Iowa, assignor to J. I. Case Company, Racine, Wis., a corporation of Wisconsin
Filed Feb. 10, 1964, Ser. No. 343,682
4 Claims. (Cl. 91—436)

The present invention relates to fluid pressure actuated apparatus, and an object is to generally improve hydraulic or fluid mechanisms of this type.

Situations are known where a double-acting cylinder, usually of rather large capacity, is loaded in one direction—as by a heavy shovel, load arm or the like—so that when the load is lowered by the usual selector or control valve, fluid is forced out of one end of the cylinder faster than it can be replaced in the other end by the usual pump. This could result in the formation of a vacuum or in cavitation in the insufficiently supplied end, overfilling of the usual reservoir, hesitation upon further actuation of the cylinder, and other disadvantages which are well known, and need not be further amplified.

Valves are known which act under these conditions to bypass or short circuit the fluid and pass it from the loaded end of the cylinder to the other end, without going through the pump, such devices being known in the trade as regenerating valves or systems. However, several cylinders in one system served by a single pump offer other difficulties, among which is a duplication of the valve mechanism. Furthermore, such installations are characterized by a directional property, and are oriented in accordance with the direction of loading of the cylinder. If the loading becomes reversed for any reason, the bypass valve becomes disabled or possibly detrimental.

Accordingly, an object of the invention is to improve a combination or system including such a cross-over or short circuiting valve, which will protect the system from the difficulties caused by one or more of the cylinders being moved too rapidly in a weight-lowering direction by the action of the weight being lowered, and which will act to achieve this object not merely for one particular cylinder, but for a plurality of cylinders, or for the total number of cylinders included in the system.

A further object is to provide an arrangement which will continue to operate advantageously in the desired manner, even if the direction of loading is changed.

The arrangement may be supplied in the form of a kit which can be installed in an existing system to bring the advantages of the invention to such a system. Also, it may be built-in within a component of the system which is there for another purpose.

A further object is to provide a device which, in addition to the above objects will act to relieve excessive back-pressure when the system is idling, particularly such as might be present in a system having a large number of units in its control valve.

The manner in which this is accomplished will appear from the following description and accompanying drawings in which:

FIG. 1 is an elevation of a portion of a backhoe typical of a machine to which the invention is applied.

FIG. 2 is a diagrammatic showing of the invention.

FIG. 3 is an elevation of a typical installation with parts broken away to show what lies within.

FIG. 4 is an enlarged detail of a modification of the device shown in FIG. 3.

FIG. 5 is an elevation, partly in vertical axial section of a valve structure in which the invention is incorporated.

FIG. 6 is an enlarged axial sectional view of a valve construction indicated in FIG. 5.

Similar reference characters have been applied to the same parts wherever they occur throughout the drawings and specification.

Figure 7:
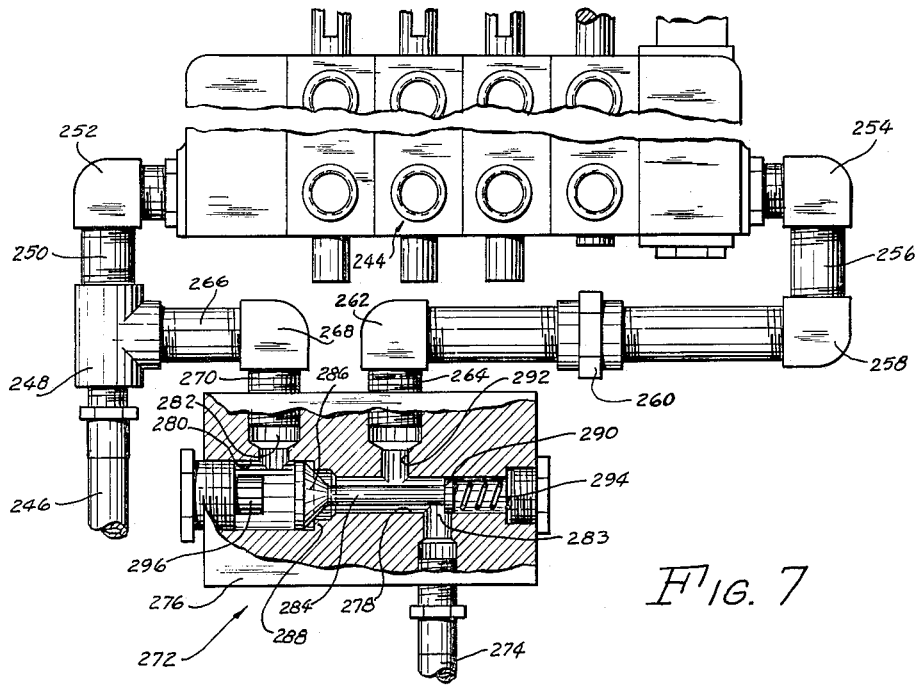
FIG. 7 is a view similar to FIG. 3, but showing a modification.

As seen in FIG. 1, the device is applied to a backhoe, commonly used in the construction industry, and which includes a base part 10 supported in any suitable manner as for example on a tractor, and on which is hingedly mounted a mast 12 to which is pivoted a boom 14 carrying a bucket 16. Mast 12 is hinged on a pin 18 so that it may swing side to side, and which swinging movement is accomplished by a hydraulic motor or fluid cylinder 20 anchored to base 10, and having a pivotal connection 22 with an arm 24 rigidly extending from mast 12 in a direction generally radially from pin 18. Extension or contraction of fluid motor 20, accordingly will cause side-to-side swinging of mast 12.

Boom 14 is pivoted to mast 12 on a pin or the like 26, and has an arm 28 extending beyond pivot 26 and having a pivotal connection 30 with a fluid motor or cylinder 32 which is anchored at 34 on mast 12. Contraction and expansion of motor 32 will therefore cause up-and-down swinging of boom 14. Mast 12 may be swung up and down about a pivotal connection 36 by means of a fluid cylinder 38 anchored at 40 and actuating mast 12 through a pivotal connection 42.

Through the motors or cylinders so far described, and the pivotal connections between base portion 10, mast 12 and boom 14, bucket 16 may be placed in any desired position within the range of the apparatus for digging purposes.

Bucket 16 has an arm 44 pivoted at 46 to a fluid cylinder 48 anchored at 50 to boom 14. Actuation of motor 48 will therefore swing bucket 16 about a pivot 52 and place it in the required position or attitude for the various operations required in digging, lifting, and dumping material.

The above mechanism is intended to be typical of those using a plurality of hydraulic motors or cylinders, one or more of which would be normally subject to a heavy load in one direction; the invention not being limited to use in a backhoe or any other specific machine, but more particularly directed to the operation and control of a plurality of hydraulic motors from a central control station, or plurality of valves indicated at 53. It is to be understood that all other parts essential to such a system are present, such for example as a reservoir, a pump for pressurizing the fluid, the necessary pipe or hose connections, and a power source for the pump, all of which are well known and not necessary to be described in detail.

As an illustration of the invention, turning to FIG. 2, we have a diagrammatic showing of sufficient of the hydraulic mechanism incorporated in the backhoe of FIG. 1, to illustrate the invention. In the diagram, 54 indicates a reservoir or sump for containing a supply of hydraulic fluid. A pump 56 receiving fluid from sump 54 pressurizes it and forces it along a passageway or conduit 58. Conduit 58 leads into a valve unit generally designated as 60. Valve 60 is connected with a cylinder 20 by conduits 62 and 64 which, through the action of valve 60 may be selectively pressurized from conduit 58 or exhausted through a passageway or conduit 66, the fluid returning to sump 54. In similar manner, cylinder 32 is controlled through conduits 68 and 70, and cylinder 48 is controlled through conduits 72 and 74. Valve 60 includes a plunger or spool 76 which controls conduits 62 and 64, a spool 77 which controls conduits 68 and 70, a spool 78 which controls conduits 79 and 80, and a spool 81 which controls conduits 72 and 74; spools 76, 77, 78 and 81 being readily shifted by means of appropriate linkage including handles 82, 84, 85 and 86 respectively.

At this point, it will be noted that cylinder 32 is biassed by the weight W of boom 14 and bucket 16 in a direction tending to pull piston rod 88 out of the cylinder. In other words, the piston 90 is continuously forced by the weight W in a direction toward the rod end of cylinder 32. On the other hand, piston 92 in cylinder 48 is continuously biassed in the direction of the head end of cylinder 48. Cylinder 20, however, and its piston 94 is generally neutral and unloaded, although it may become biassed or loaded in either direction, in the even that the machine is standing on uneven ground when operated. For example, if the machine is slanted away from the observer in FIG. 1, the rather substantial mass of mast 12, boom 14, and bucket 16 and its load will tend strongly to swing the boom away from the observer at all times, and will therefore bias piston 94 toward the rod end of cylinder 20, and herein lies one of the advantages of the invention.

Considering for a moment cylinder 32 which is normally loaded by the weight of boom 14 and bucket 16 in the direction to move piston 90 toward the rod end— upwardly in FIG. 1, and downwardly in FIG. 2—it is desirable in a machine such as a backhoe that boom 14 and bucket 16 should be capable of a quick return from an elevated position, and to exert immediately thereafter, downward pressure on bucket 16 for digging purposes. Downward pressure is exerted by fluid pressure in conduit 68 which pressurizes the space 89 beneath, and raises piston 90, and upon movement of piston 90, forces fluid from the space 91 above piston 90 as seen in FIG. 1, through conduit 70 back through conduit 66 to sump 54. However, owing to the substantial weight of boom 14 and bucket 16, the desired downward movement takes place without the presence of pressure in conduit 68, the weight forcing fluid rapidly through conduit 70, and even more rapidly than fluid can be supplied by pump 56. This, in the past, has caused a vacuum or cavitation in the space 89 beneath piston 90.

Fluid in the space above piston 90 will be forced, in a manner which will be fully described, through valve 60 into conduit 66 and through a restriction 96 on its way to sump 54. However, the flow of fluid, under the weight of boom 14, will become so rapid that appreciable pressure will be generated in passageway 66, while at the same time the fluid in passageway 58 will flow so freely into the space 89 beneath piston 90 that the pressure in passageway 58 will be largely dissipated, and will drop well below that temporarily in passageway 66. Such pressure will be transmitted through a bypass passageway 98, FIG. 2, and will displace a check valve 100 and pass into passageway 58 to augment the fluid coming from pump 56. The two volumes will be sufficient to supply the space 89 so that no cavitation will occur by reason of the rapid movement of piston 90. Any surplus of fluid over that needed will still escape through restriction 96.

A similar action takes place in cylinder 48 in which what might be termed its permanent loading is in the other direction. In this case, the release of fluid by valve 60 through conduit 74 will allow piston 92 to fall in FIG. 2. In this situation, the fluid coming from space 102 will exceed the capacity of space 104. Even so, the rapidity of movement will require fluid in space 104 more rapidly than it can be supplied by pump 56. Fluid from space 102 will be transferred to passageway 66 and will displace check valve 100 and add to the fluid coming from pump 56. A substantial portion of the fluid coming from space 102 will pass through restriction 96 to sump 54, but in any event, space 104 will be maintained completely full of fluid so that there will be no danger of cavitation in space 104.

In the case of cylinder 20, no action is normally expected in bypass 98; however, it is noteworthy that, if a bias *is* imposed on cylinder 20, bypass 98, will operate in the manner described in connection with cylinder 32, if the bias is one way, or in the manner described in connection with cylinder 48, if the bias is the other way. Such a condition might arise in a number of ways, but in the illustrated machine, if the machine were standing on slanted ground, for example, mast 12 and boom 14 would tend to swing very strongly in one direction and impose a continuous or permanent load on cylinder 20. If the load were toward the rod end of cylinder 20, whenever valve 60 was shifted to produce movement in that direction, fluid from the space 106 would pass through conduit 64 and valve 60 into conduit 66 and cross over through bypass 98 to conduit 58, then supplying space 108 through conduit 62, to allow rapid swinging of boom 14 and mast 12 without the possibility of cavitation in space 108. As will be apparent, if the mast happened to slant the other way, fluid would be transferred from space 108 through valve 60 and passageway 98 to conduit 58 and space 106.

It will therefore be apparent that the device will perform its cavitation relieving action without any readjustment or attention on the part of the operator, even though the direction of permanent loading is changed from one end of the cylinder to the other. Furthermore, it will be apparent that a single bypass will serve to accomplish this purpose for a plurality of cylinders, and in fact, for as many cylinders as happen to be connected to valve 60.

Several embodiments of the invention will now be described.

As stated, the device may be applied to systems already in existence, and such an installation is shown in FIG. 3. In this embodiment, a valve 110 is supplied with fluid from any suitable pump, not shown, through a conduit 112, commonly a hydraulic hose of well-known form. Conduit 112 connects to a T 114 and then through an elbow 116 to valve 110. Valve 110 distributes the fluid in well-known manner to one or more cylinders, through connections as 118 and 120, the fluid returning through an elbow 122 and a nipple 124, to a T 126. At this point, the fluid under most conditions would pass on through a nipple 128 and through a restricting member 130 and a conduit 132; restriction 130, however, being insufficient to interfere materially with the ordinary manipulation of any cylinders which connect with valve 110. However, in the event of the movement of a heavily loaded cylinder, such for example as previously mentioned cylinder 32, the pressure in conduit 112 and T 114 will be dissipated, as hereinbefore explained, while that in T 126 will rise by reason of restriction 130. This pressure will be transmitted through a conduit or hydraulic hose 134 to a check valve 136, displacing a valve poppet 138 and permitting fluid to flow through check valve 136 into T 114. In this way, the action described in connection with FIGS. 1 and 2, is accomplished and the principle may be readily applied to a system already in existence.

It might be that there would be enough friction or other resistance in conduit 132 to result in a rise of pressure in T 126 under the condition of releasing a heavily loaded cylinder, in which case restriction 130 would not be necessary and could be omitted. It also might be that restriction 130 would be objectionable under some conditions. A modification replacing restriction 130 with a relief valve 140 is shown in FIG. 4.

A shell 142 has a bore 144 which connects with abovementioned nipple 128. Bore 144 is closed by a valve disk 146 pressed against a seat 145 at the end of bore 144 remote from nipple 128, a spring 148 reacting against a pin or the like 150, yieldingly maintaining disk 146 against seat 145. Spring 148 is preferably light so that disk 146 is relatively easily pushed away from seat 145 by the pressure of fluid coming through bore 144. Disk 146 therefore provides a restriction to the flow of fluid through nipple 138 and bore 144 to cooperate with bypass conduit 134 and check valve 136 in the manner above outlined. On the other hand, under conditions where a very large volume might at times pass through nipple 128, valve disk 146 may be readily pushed away and allow full volume flow without objectionable restriction.

As stated, the invention may be incorporated in a component of the system which is there for another purpose, specifically the multiple valve which controls the several cylinders. Hereinbefore mentioned valve 60 is basically of well-known form comprising an end plate or cover 154, FIG. 5, a plurality of valve bodies 156, 158, 160, and 162, and an entrance cover or plate 164. Valve bodies 156 through 162 are preferably identical and may be placed together or "stacked" to form as long an assemblage as desired, so as to contain the number of valves or spools required by the particular application. The assemblage results in a composite valve which is basically well known, but in which the invention may be incorporated as heretofore indicated. The valve has an inlet opening 166 which receives the full flow from the pressure fluid source. In idling or inactive position, fluid enters inlet 166, flows through a passageway 168, through a divided port 170 in valve body 162, where it passes on either side of a piston or land 172, uniting in a port 174 and passing on to a divided port 176 in valve body 160. Here it passes on either side of a piston 178 and through valve body 160 in the same manner as that just described. In this manner, the fluid flows through the entire stack of valve bodies in a zig-zag path, arriving finally in a port 180 in valve body 156. Port 180 registers with an exhaust passageway 182 formed in cover plate 154 and the bypass fluid is conducted back to the reservoir through any suitable conduit connected to an outlet port 184.

In this manner, the output of the usual pump is allowed to flow freely through valve 60 without generating any substantial pressure. However, in the event that one of the spools as 77 is displaced as in the dotted position, land 178 will block one side of port 176, while another land 186 will block the other branch of port 176. As is well known, this will result in a virtually instantaneous rise of pressure in inlet port 168. Such pressure is commonly immediately utilized to actuate the particular cylinder connected to spool 77. However, in the event that resistance to movement is sufficient to prevent such cylinder from receiving fluid, excessive pressure which could otherwise be developed, forces fluid into a port 187 of a relief valve 188 of suitable or well-known type, the fluid escaping through a port 190 in relief valve 188 into a chamber or passageway 192 in plate 164. Chamber 192 registers with a passageway 194 in valve body 162, a similar passageway 196 in valve body 160 registering with passageway 194. In similar manner, a passageway 198 in valve body 158 registers with passageway 196 and a passageway 200 in valve body 156 registers with passageway 198. Thus, there is a continuous passageway entirely through the stack of valve bodies, and which connects with a chamber 202 in cover plate 154. Chamber 202 surrounds exhaust passageway 182, but connects therewith through a restricted opening 204 for a purpose to be described, which is calibrated to pass the normal output of the pump without serious pressure rise, so that fluid flowing as described will find its way from inlet port 166 to outlet port 184 without generating pressure materially greater than that for which valve 188 is adjusted. However, such pressure will be transmitted in a direction away from the observer in FIG. 5 through a passageway 206 spaced behind divided port 170. The fluid enters a passageway 208 and arrives at a pressure port 210 which is blocked by a land 212. Passageway 208 has a branch 214 which leads to a pressure port 216. In the dotted position of spool 77, port 216 is in communication with a port 218 which is connected through suitable piping to its appropriate cylinder. The fluid under pressure therefore passes out through port 218 to actuate said cylinder. Assuming such cylinder is not blocked, but is free to move its load, fluid from the other end of this cylinder arrives at a port 220 which is in communication by reason of the position of spool 77 with above-mentioned passageway 196. The fluid therefore flows through said passageway and passageways 198 and 200 into chamber 202, and through restriction 204 to exhaust port 184. This would be the usual operation of a device of this type.

Assuming now that the cylinder connected to spool 77 is heavily loaded in the direction it would be acuated by displacement of spool 77 to the dotted position, the flow of fluid would be very rapid from port 220 into passageway 196. At the same time, the flow from port 218 into the cylinder would be unopposed by reason of the movement of the cylinder caused by the load, as described in connection with FIG. 2. Under these conditions, the demand for fluid at ports 216 and 218 becomes greater than the capacity of the pump, and the pressure fails, or drops to a low value. Furthermore, the volume of fluid discharged into passageway 196 is so great as to be largely in excess of the capacity of restriction 204 so that substantial pressure is developed in passageway 196. This pressure is also effective in passageways 194, 198 and 200 and is transmitted to chambers 192 and 202. Chambers 192 and 202 also connect with a series of passageways 220, 222, 224 and 226 in the ends of valve bodies 156, 158, 160, and 162, respectively, remote from passageways 200, 198, 196 and 194. Chambers 192 and 202 in connection with the several passageways form what might be termed a peripheral exhaust passageway, for receiving and disposing of spent fluid from relief valve 188 and also from any or all of spools 76, 77, 78 and 81.

Fluid emerging from port 220 will find its way through passageway 194 and also through passageway 198 and said peripheral exhaust passageway to chamber 192 and will enter a port 228 in a check valve 230, more particularly shown in FIG. 6. A poppet or valve disc 232 pressed by a light spring 234 against a seat 236, is forced off of seat 236 by the pressure differential, it being remembered that, at the moment a pressure has developed in the peripheral passageway while the pressure in passageway 168 has failed. Fluid therefore flows past seat 236 and out through a port or ports 238 into passageway 168 to replenish the fluid therein and prevent the formation of a vacuum in the cylinder 32 or any other part of the system.

It will be apparent that an equivalent replenishing or regenerating effect will take place if the loading is in the direction of movement caused by the lowering of a spool, for example to the dotted position of spool 76. In this case, the fluid will flow from a port 240 into passageway 226 to assist in supplying the demand of the cylinder connected to a port 242. The device is therefore equally effective whether the cylinder is loaded one way or the other, and also if the direction of loading changes while the cylinder is operating. In fact it is within the contemplation of the invention that regeneration or replenishment of several cylinders may take place simultaneously, and again without regard for the direction in which the cylinders may be loaded.

Variations and refinements are contemplated in the device, one of which is shown partly diagrammatically in FIG. 7.

In this embodiment, which of course includes the usual reservoir and pump, although not shown, a valve assembly 244 corresponding to above described valve assembly 110 is supplied with fluid through a conduit 246, the fluid flowing through a T 248, a short length of pipe 250, an elbow 252, and leaving the valve through an elbow 254, a short length of pipe 256, an elbow 258, a union 260, an elbow 262, and a nipple 264. In this respect, the arrangement is similar to the FIG. 3 embodiment. How-T 248 connects with a nipple 266, an elbow 268, and a nipple 270 which connects with a special valve, generally designated as 272. Nipple 264 also connects with valve 272, and a discharge conduit 274 leads from valve 272 back to the reservoir.

Valve 272 comprises a block or body portion 276 which has a central bore 278. Bore 278 has an enlarged portion 280 which communicates through a port 282 with abovementioned nipple 270 so that pressure in conduit 246, and accordingly in the inlet portion of valve 244 is also applied to the enlarged portion 280 of bore 278. Above-mentioned nipple 264 connects into bore 278, and bore 278 communicates with conduit 274 through a port 283. A shuttle or spool 284 is slidable in bore 278 and enlarged portion 280, and has a head 286 which, in the normal operation of the device is pressed against a seat 288, formed between bore 278 and enlarged portion 280, by the pressure in conduit 246, which pressure is effective against the area of head 286. Shuttle 284 also has a piston 290 which, in this position of the parts is shifted beyond port 283, so that fluid discharged from valve 244 may enter through nipple 264 and a bore 292 into bore 278, and escape substantially without restriction through port 283.

In this manner, cylinders controlled by valve 244 may be operated simultaneously without any restricting effect on the return of spent fluid to the reservoir.

Shuttle 284 is urged to the left, or in the direction of enlarged portion 280 by means of a spring 294 which tends to maintain head 286 normally off of seat 288.

Figure 8:
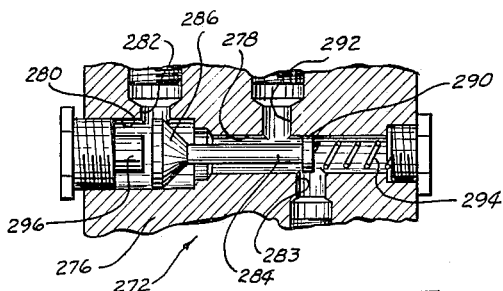
FIG. 8 is a detail of certain mechanism shown in FIG. 6, with the parts in a different position.
Figure 9:
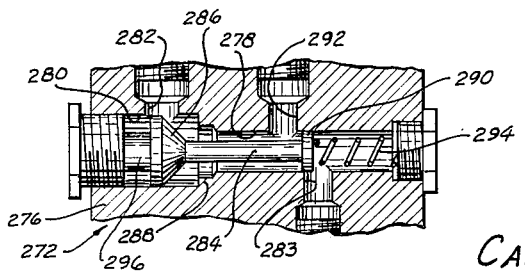
FIG. 9 is a similar view with parts in still another position.

In the event that a cylinder having a heavy permanent loading is discharged by valve 244, as previously explained, the demand for fluid from conduit 246 may momentarily become considerably greater than the capacity of the pump. In this case, the pressure in conduit 246, and accordingly in enlarged portion 280 will drop; while the rush of fluid into bore 278 may cause a more or less substantial rise in pressure therein. Since the area of head 286 is exposed to such pressure is greater than the area of piston 290, so exposed, shuttle 284 will move to the left, as seen in FIG. 8, and in fact into the position shown in FIG. 9, and will open bore 278 to port 282, and close bore 278 to port 283. Fluid is therefore prevented from discharging through conduit 274, and by-passed directly into port 282, and thence to nipple 270, and so on into valve 244. Under these conditions, spool 284 will be held forcibly in its leftward position and against a stop 296 which locates head 286 in a position to open port 282 to enlarge portion 280 on both sides of head 286. This is desirable so that head 286 will be free to move to the right without developing a vacuum in the space at the left side of the head as seen in FIG. 9. Other means are contemplated for venting this space within the scope of the invention.

In the event that a cylinder having a permanent load on its head end is discharged, the fluid entering port 292 may exceed the volume demanded by port 282 by reason of the displacement of the piston rod, and which will cause a pressure rise in port 282 which will develop an appreciable pressure in bore 278. Since any pressure in port 282 is effective on both sides of head 286, such pressure is neutralized, insofar as head 286 is concerned, and since there is no pressure in port 283, the pressures on piston 290 are unbalanced and piston 290 is forced to the right, opening port 283 to bore 278. This condition is seen in FIG. 8. However, since the pump output is insufficient to supply the demand, the pressure in port 282 does not build up sufficiently to seat head 286 on seat 288, and spool 284 remains displaced to the left, in practice taking up a position wherein both ports 282 and 283 are partly open so that the cylinder is adequately supplied, while at the same time the surplus fluid is discharged through port 283.

Spring 294 acts to displace spool 284 to the left in FIG. 7 at such times as the system is idle, or when there is no pressure differential in valve 272. This insures that there will some restriction to the flow of fluid out through port 283, so that there will be no appreciable delay in the initiation of the regenerating action, and in fact spring 294 may be proportioned to maintain spool 284 in a leftward position as seen in FIG. 9, at all times except when displaced by the fluid pressure, which action is responsible for another advantage.

Returning to a consideration of the multiple valve of FIG. 5, it will be appreciated that the fluid, when traversing the valve, or bypassing, is forced to travel an irregular or tortuous path which will give rise to a certain amount of frictional resistance, and the more units incorporated in the stack, the greater the resistance will be. Any continuous resistance is disadvantageous because of the waste of power, heating of the fluid, and for other reasons, and valve 272 is well adapted to minimize this loss.

Assuming valve 244 in bypassing condition, and valve 272 in the position shown in FIG. 9, if the system is put into operation, pressure fluid will start flowing in pipe 250 and through the hereinbefore described zig-zag path through valve 244 toward pipe 256 as described in connection with FIG. 5, and eventually to port 292. However, the exit to port 283 is blocked by piston 290, so there will be a rise in pressure in ports 282 and 292, and therefore in bore 278. Since there is no pressure in port 283, and pressure acts on both sides of head 286, spool 284 is forced to the right to about the position shown in FIG. 8, in which port 283 is partially open so as to pass the pump output into port 283. The presence of spring 294 will require the development of a predetermined pressure in bore 278 in order to maintain spool 284 in such position, and which pressure can be determined by the calibration of spring 294. In practice the spring is made flexible enough so that the resulting pressure will not be objectionable. It will be noted that the intermediate position of spool 284 is such that port 282 is in communication with port 283 so that fluid may bypass through valve 272 as well as through valve 244. As a result, the fluid may bypass through both valves at once, the resistance or back-pressure being determined by the spring 294 and not by the number of sections or units in valve 244. Thus, if valve 244 in a particular installation contains a large number of sections, so that the flow through it would result in excessive back pressure, the greater part of the fluid will flow through port 282 and bore 278, and the back pressure will again be determined by spring 294, and not by the resistance of the zig-zag passageway through valve 244.

Spring 294 is preferably so calibrated that the pressure developed by the full flow of the pump will shift spool 284 to the right and seat head 286 on seat 288, thereby removing any restriction to the flow in return pipe 256 and conduit 274 as hereinbefore described. Thus, the efficiency of the particular motor in use is enhanced, as well as that of the whole system.

When a loaded cylinder is discharged, it is to be noted that, unlike the embodiments of FIGS. 2, 3 and 5, there is no fixed restriction in return pipe 256 or conduit 274. Therefore, the load on such a cylinder may be lowered as rapidly as desired under control of valve 244, since there is either no restriction at all to the fluid discharging from the cylinder, or at most only that imposed by spring 294 acting on piston 290. The net result is faster operation or cycling of the machine as a whole.

The operation of the device is thought to be clear from the foregoing, it being understood that the system is designed to work with a positive displacement pump of limited capacity, which is the type best adapted to the kind of operation contemplated. Sufficient to say, the pump supplies a constant volume of fluid which flows freely through the usual multiple control valve, or is bypassed at such times as no work is required from the fluid system. When any one or more of the control valve units is displaced, pressure is immediately built up to actuate the desired motor. However, if the particular motor is already loaded in the direction it is desired to move, it could move under the urging of its load, more rapidly than the pump could supply fluid to actuate it. Under these conditions, the motor would discharge a large volume of spent or exhaust fluid, and the device of the invention would direct all, or as much as necessary of this fluid back to the inlet of the control valve to supply the momentary deficiency in the volume of fluid coming from the pump.

In this way, cavitation and infiltration of air is avoided, and without supplying a larger pump. Such a pump is unnecessary for the lowering of a permanent load on a fluid motor, since the load itself will do the work, and, furthermore, a large volume pump would not ordinarily be capable of the high pressure required at other times, without other complication.

Another advantage in the invention lies in the fact that advantage can be taken of the rapid lowering of a load which is possible without detrimental effects, and particularly in the embodiment of FIG. 7 and any equivalent modifications thereof. A load, such as a bucket or boom may be lowered under control of the operator as rapidly as desired, which materially speeds up the overall operation of the machine.

The device therefore constitutes a solution of a problem which has been troublesome in hydraulic systems of the type outlined. It is versatile in its action, and fully capable of accomplishing the objects of the invention.

What is claimed as new and desired to be secured by Letters Patent of the United States is:

1. In a fluid pressure actuator of the type comprising a fluid reservoir, a pump, a selector valve, a fluid motor and means providing a passageway between said reservoir and said pump, a high pressure passageway leading from said pump to said selector valve, a low pressure passageway leading from said selector valve, a return passageway leading to said reservoir, and a pair of passageways leading from said selector valve to said fluid motor either of which may serve as an inlet, and the other as an outlet for said fluid motor from time to time, a cross connection between said high pressure passageway and said low pressure passageway comprising the combination of a valve body providing a
 bore forming a transfer passageway constituting part of said cross connection and communicating at one end with said high pressure passageway and at the other end with said return passageway, said low pressure passageway entering said bore
 between said high pressure passageway and said return passageway, a
 valve element interposed in said bore between said low pressure passageway and said return passageway and shiftable into a position to block the flow of fluid from said low pressure passageway through said bore into said return passageway,
 yielding means engaged with said valve element and urging it continuously toward said position to block flow of fluid into said return passageway, said valve element being positioned to be displaced against the resistance of said yielding means by relatively light fluid pressure in said bore,
 valve means in said bore between said high pressure passageway and said low pressure passageway and positioned to be shifted by high pressure in said high pressure passageway into position to
 block the flow of fluid from said high pressure passageway through said bore,
 means rigidly connecting the last mentioned valve means with said valve element so that such shifting of said last mentioned valve means will cause corresponding shifting of the first mentioned valve element, against the resistance of said yielding means to a position
 opening said bore and therefore said low pressure passageway to said return passageway.

2. A transfer valve for use in a fluid pressure actuator of the type including a fluid reservoir, a pump, a selector valve and a plurality of fluid motors and means providing a high pressure passageway leading to said selector valve, a low pressure passageway leading from said selector valve, a return passageway leading to said reservoir, and a pair of passageways leading from said selector valve to said fluid motor either of which may serve as an inlet, and the other as an outlet for said fluid motor from time to time, said transfer valve comprising the combination of a valve body providing a
 bore communicating at one end with said high pressure passageway and at the other end with said return passageway, said low pressure passageway entering said bore
 between said high pressure passageway and said return passageway, a
 valve element interposed in said bore between said low pressure passageway and said return passageway and shiftable into a position to block the flow of fluid from said low pressure passageway through said bore into said return passageway,
 yielding means engaged with said valve element and urging it continuously toward said position to block flow of fluid into said return passageway, said valve element being positioned to be displaced against the resistance of said yielding means by relatively light fluid pressure in said bore,
 valve means in said bore between said high pressure passageway and said low pressure passageway and positioned to be shifted by high pressure in said high presure passageway into position to
 block the flow of fluid from said high pressure passageway into said bore,
 means rigidly connecting said valve means with said valve element so that such shifting of said valve means will cause corresponding shifting of said valve element, against the resistance of said yielding means to a position
 opening said bore and therefore said low pressure passageway to said return passageway.

3. In a fluid pressure actuator of the type comprising a fluid reservoir, a pump, a selector valve and a fluid motor and means providing a passageway between said reservoir and said pump, a high pressure passageway leading from said pump to said selector valve, a low pressure passageway leading from said selector valve, a return passageway leading to said reservoir, and a pair of passageways leading from said selector valve to said fluid motor either of which may serve as an inlet, and the other as an outlet for said fluid motor from time to time, a cross connection between said high pressure passageway and said low pressure passageway comprising the combination of a valve body providing a
 bore forming a tranfer passageway constituting part of said cross connection and communicating at one point with said prassure passageway and at another point with said return passageway, said low pressure passageway entering said bore
 between said high pressure passageway and said return passageway, a
 valve element interposed in said bore between said low pressure passageway and said return passageway and shiftable into a position to block the flow of fluid from said low pressure passageway through said bore into said return passageway,
 valve means in said bore between said high pressure passageway and said low pressure passageway and positioned to be shifted by pressure in said bore greater than the pressure in said high pressure passageway, into position to provide for free flow of fluid from said bore into said high pressure passageway, means rigidly connecting said valve means with said valve element such that shifting of said valve means will cause corresponding shifting of said valve element, to a position blocking said bore and therefore preventing the flow of fluid from said low pressure passageway to said return passageway.

4. A transfer valve for use in a fluid pressure actuator of the type including a fluid reservoir, a pump, a selector valve, a plurality of fluid motors and means providing a passageway between said reservoir and said pump, a high pressure passageway leading from said pump to said selector valve, a low pressure passageway leading from said selector valve, a return passageway leading to said reservoir, and pairs of passageways leading from said selector valve to each of said fluid motors either of which may serve as an inlet, and the other as an outlet for its respective fluid motor from time to time, and said selector valve having means providing a passageway for bypassing fluid from said high pressure passageway to said low pressure passageway at such times as no fluid motor is in use, said transfer valve providing a cross connection between said high pressure passageway and said low pressure passageway, and said transfer valve comprising the combination of a valve body providing a bore forming a transfer passageway constituting part of said cross connection and communicating at one end with said pressure passageway and at the other end with said return passageway, said low pressure passageway entering said bore between said high pressure passageway and said return passageway, a valve element interposed in said bore between said low pressure passageway and said return passageway and shiftable into a position to block the flow of fluid from said low pressure passageway through said bore into said return passageway, yielding means engaged with said valve element and urging it continuously toward said position to block flow of fluid into said return passageway, said valve element being positioned to be displaced against the resistance of said yielding means by relatively light fluid pressure in said bore, valve means in said bore between said high pressure passageway and said low pressure passageway and positioned to be shifted by high pressure in said high pressure passageway into position to block the flow of fluid from said high pressure passageway into said bore, means rigidly connecting the last mentioned valve means so that such shifting of said last mentioned valve means will cause corresponding shifting of the first mentioned valve element, against the resistance of said yielding means to a position opening said bore and therefore said low pressure passageway to said return passageway, and said means rigidly connecting said valve means and said valve element being of a length that said valve element and said valve means may take an intermediate position wherein fluid is free to flow past said valve means into said bore from said high pressure passageway, and wherein fluid is also free to flow from said bore into said return passageway, so that said transfer passageway may act as an additional bypass for fluid from said pump at times when no work is required from said fluid motors.

References Cited by the Examiner
UNITED STATES PATENTS

| | | | |
|---|---|---|---|
| 2,311,912 | 2/1943 | Travilla | 91—438 X |
| 2,367,682 | 1/1945 | Kehle | 91—436 X |
| 2,646,025 | 7/1953 | Deardorff | 91—436 |
| 2,890,683 | 6/1959 | Pilch | 91—438 X |
| 2,980,136 | 4/1961 | Krehbiel | 91—436 |
| 2,985,142 | 5/1961 | Aiken | 91—436 |
| 3,077,901 | 2/1963 | Klessig | 137—621 |
| 3,099,289 | 7/1963 | Neilson | 137—596 |
| 3,133,559 | 5/1964 | Tennis | 137—596 |

SAMUEL LEVINE, *Primary Examiner.*

FRED E. ENGELTHALER, *Examiner.*

P. T. COBRIN, *Assistant Examiner.*